United States Patent [19]

Jurik

[11] Patent Number: 4,946,218

[45] Date of Patent: Aug. 7, 1990

[54] VEHICLE STABILIZING DEVICE

[76] Inventor: Peter L. Jurik, 275 Solar Court, Coquitlam, B.C. V3K 6B3, Canada

[21] Appl. No.: 326,644

[22] Filed: Mar. 21, 1989

[51] Int. Cl.⁵ .............................................. B62D 35/00
[52] U.S. Cl. .................................. 296/180.1; 180/903
[58] Field of Search ...................... 296/180.1, 180.2; 180/903

[56] References Cited

U.S. PATENT DOCUMENTS

| 3,776,587 | 12/1973 | Oxlade | 296/180.5 |
| 4,284,302 | 8/1981 | Drews | 296/180.1 X |
| 4,386,801 | 6/1983 | Chapman et al. | 296/180.1 X |
| 4,455,045 | 6/1984 | Wheeler | 296/180.1 X |

FOREIGN PATENT DOCUMENTS

| 3410296 | 9/1985 | Fed. Rep. of Germany | 296/180.1 |
| 2363472 | 3/1978 | France | 296/180.1 |
| 0155175 | 7/1987 | Japan | 296/180.1 |
| 463620 | 3/1937 | United Kingdom | 296/180.1 |
| 2135941 | 9/1984 | United Kingdom | 296/180.1 |
| 2143480 | 2/1985 | United Kingdom | 296/180.1 |

Primary Examiner—Robert R. Song
Attorney, Agent, or Firm—Evenson, Wands, Edwards, Lenahan & McKeown

[57] ABSTRACT

A vehicle stabilization mechanism which uses a corrugated skin underneath a racing vehicle to alter the air flow beneath the vehicle and create a downward pressure for greater traction.

11 Claims, 1 Drawing Sheet

VEHICLE STABILIZING DEVICE

BACKGROUND OF THE INVENTION

The present invention relates to a vehicle stabilization device and, more particularly, to a stabilizing mechanism for a racing vehicle which utilizes a corrugated skin underneath a vehicle to utilize Bernoulli's principle by altering the air flow beneath the vehicle to create a downward pressure on the vehicle for greater traction while minimizing drag on the vehicle.

Aerodynamic stabilizers for vehicles are known. For example U.S. Pat. No. 3,524,672, shows a stabilizer mounted in the air flow beneath the vehicle comprising a web having a planar undersurface and a cross strut mounted adjacent the undersurface of the web so as to be spaced therefrom. A planar surface is inclined to the undersurface of the web in the normal direction of the air flow, and a plurality of planar supporting vanes are arranged substantially parallel to the direction of the air flow. This conventional stabilizer has been formed from materials such as sheet aluminum or synthetic plastic, a primary concern being resistance to corrosion. Spaced apertures are provided in the web for bolting the stabilizer to the underside of the front end of an automobile to overcome the tendency of the front end of rear-engine automobiles to lift at high speed with a consequent loss of steering control and a susceptibility to side winds. This stabilizer is intended to increase the effective weight of the giving a more positive steering response at high speeds. However, the projecting vanes are dangerous to persons maintaining the vehicle and could be deadly in the case of an accident. Moreover, the speed of the air entering the stabilizer is changed only at the mouth of the stabilizer rather than at various points along the undersurface of the vehicle.

Another form of stabilizing device utilizing the venturi effect for racing vehicles is shown in U.S. Pat. No. 3,768,582. In particular, a pair of air foils are located on the vehicle body between the front wheels and form an integral part of the chassis construction while housing the upper front wheel supports. A second pair of symmetrical air foils are located on each side of the driver and between the driver compartment and the rear wheels. These latter air foils are much thicker and larger than the first pair so as to generate more lifting force during a turning operation by increasing the angle of attack relative to the oncoming air stream. However, this is applicable only to the inboard air foil which effectively increases the weight of the car on the inboard turning side while the outboard air foil is subjected to a much smaller angle of attack, thereby generating practically no horizontal force or vertical force. It will be readily appreciated that such a device will be limited to racing vehicles with a particular superstructure design, namely a formula racer.

U.S. Pat. No. 3,776,587 describes a surface vehicle which has an underside defining a venturi between the underside of the vehicle and the surface upon which the vehicle is travelling to create a force opposite the lifting force generated during high speed operation. This arrangement is intended to avoid the problem created by air foils of the type described above which can become dislodged and cause serious damage to drivers and spectators at racing events. Unfortunately, it is an expensive solution in that the vehicle itself must have the shape needed to produce the venturi effect.

Another form of road traction increasing mechanism is shown in U.S. Pat. No. 3,894,609. However, such a device is relatively complicated and impractical in racing vehicles in that it requires an inflatable annular cushion which is in its rest position not inflated and restrained underneath the vehicle floor. Furthermore, a control valve is needed to control the degree of filling of the annular cushion along with an inflating means such as a pump and a load sensor. As the ground clearance increases due to a decrease in the load condition of the vehicle, the annular cushion is intended to inflate further, while as the ground clearance decreases the air in the cushion is exhausted through a vent. Although such an arrangement might be suitable to slower moving passenger motor vehicles, it too cumbersome, heavy and impractical for use in a high speed racing vehicle and would unduly increase drag to an unacceptable degree for modern racing vehicles.

Likewise, the aerodynamic device shown in U.S. Pat. No. 4,511,170 utilizing winglets projecting from the bottom sides of a vehicle body would also be impractical in a racing vehicle and would also be extremely dangerous if one or more of the winglets were to be broken away from the vehicle body.

SUMMARY OF THE INVENTION

It is an object of my invention to overcome the problems and disadvantages encountered with prior art aerodynamic stabilizers by placing a corrugated skin of metal or the like under the vehicle body to achieve a Bernoulli effect. The corrugations according with my invention consist of arcs of cylinders with their convex side facing toward the road and their concave side facing the underside of the vehicle.

It is yet a further object of my invention to provide a series of corrugations running along the longitudinal direction of the vehicle and extending at least to the sides of the vehicle with, for example, spacings of the corrugations about one foot apart. The foregoing objects have achieved an aerodynamically reduced air pressure under the car so as to create an additional downward force on the car and a significant increase in the car's stability without dangerous appendages or complicated mechanisms which unduly hamper the vehicle's maneuverability.

BRIEF DESCRIPTION OF THE DRAWINGS

These and further features, objects and advantages of the present invention will become more apparent from the following detailed description when taken in conjunction with the accompanying drawings wherein.

DETAILED DESCRIPTION OF THE PRESENTLY PREFERRED EMBODIMENTS

Figure 1:
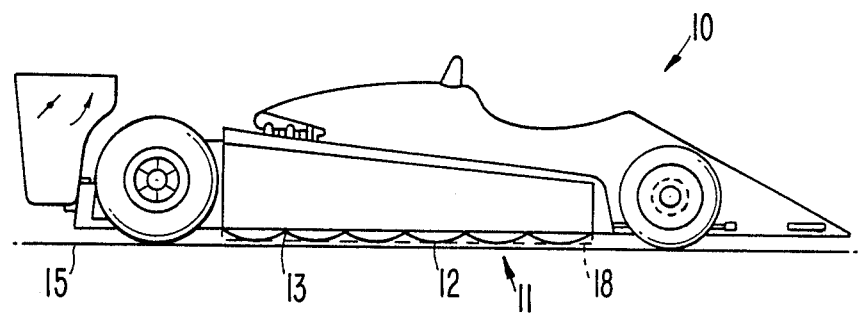
FIG. 1 is a side view of the vehicle with the corrugated stabilizing means at the vehicle mid-section in accordance with the present invention.

In FIG. 1 there is shown a racing vehicle designated generally by the numeral 10. Since the details of the vehicle are well known and are not germane to the present invention, further detailed discussion thereof is deemed unnecessary.

With respect to the present invention, the underside of the mid-section of the vehicle is provided with a stabilizing device 11 in the form a series of undulations or corrugations 12 along the longitudinal direction of the vehicle 10 so as to form shallow arcs whose convex surface is faces the road and whose concave surface faces the underside of the vehicle superstructure. The corrugations 12 define a series of cusps 13 which extend to the sides of the vehicle can be attached to the vehicle superstructure for structural rigidity of the stabilizing device 11.

The stabilizing or ground effect device 11 in accordance with the present invention can be in the form of a continuous plate having the corrugations 12 formed thereon by a standard forming process or a series of individual arcuate plates which are bolted, welded or otherwise securely fastened to the vehicle structure. Furthermore, the corrugations 12 can be fabricated from any structurally suitable metal or synthetic material which can also be corrosion resistant.

Figure 2:
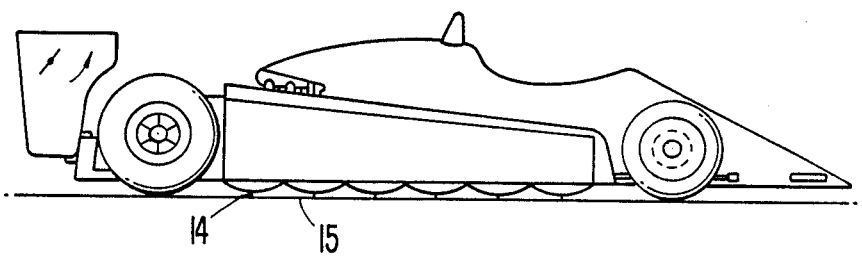
FIG. 2 is a view similar to FIG. 1 but shows lines of low pressure below the apexes of the corrugations when the vehicle is in motion.

FIG. 2 is similar to FIG. 1 but shows the low pressure areas shown by the lines 14 extending between the convex side of the corrugations 12 and the road surface 15 created beneath the corrugations during high speed operation of the vehicle. The venturi effect created holds the vehicle towards the road to overcome any lifting forces created during high speed operation or during turning. This effect increases as the speed of the vehicle increases but in a way which minimizes danger and vehicle weight.

Figure 3:
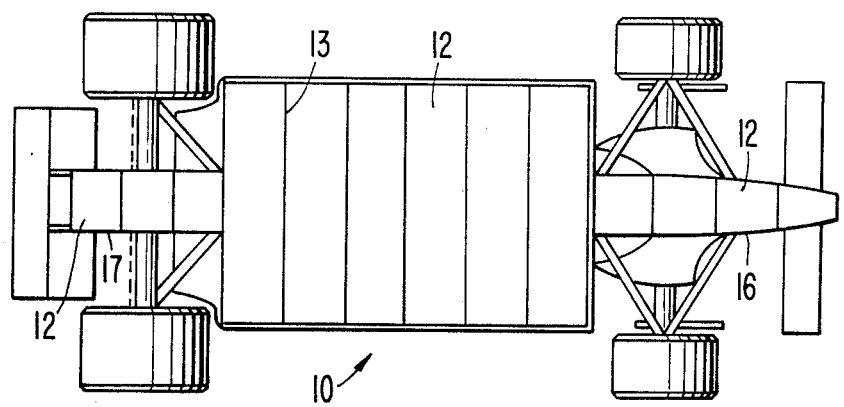
FIG. 3 is a bottom view of the vehicle shown in FIGS. 1 and 2 but showing another embodiment of the corrugations which extend from the front end of the vehicle to the rear end of the vehicle.

As is also evident from FIG. 3 of the drawings, the stabilizing device can be employed along the entire length of the vehicle 10 including the reduced portions at the front 16 and rear 17 of the vehicle. Alternatively, the corrugations can be provided at a particular area of the vehicle underside depending on the amount and type of stabilizing effect which is desired.

While I have shown and described presently preferred embodiments in accordance with my invention, it should be understood that the same is susceptible of changes and modifications without departing from the scope of my invention. For instance, instead of sharp cusps between the undulations a smooth transition can be provided for further streamlining. To enhance the flow, a skirt can extend along both sides of the vehicle to contain the flow over the undulations as shown by the dotted line 18 in FIG. 1 and thereby increase the efficiency of the stabilizing device. Therefore, I do not intend to be limited to the details shown and described herein but intend to cover all such changes and modifications as are encompassed by the scope of the appended claims.

I claim:

1. A stabilizing arrangement adapted for use in a vehicle, comprising a plurality of undulations defining a series of convex cylindrical surfaces facing a road surface upon which the vehicle is intended to ride and extending between sides of the vehicle, the plurality of undulations running along a longitudinal direction on the underside of the vehicle and spaced from the road surface such that law pressure areas are formed at portions of the undulations closest to the road surface when relative motion between the vehicle and the road surface causes passage of air over the undulations.

2. A stabilizing arrangement according to claim 1, wherein the undulations further define a concave surface facing the underside of the vehicle.

3. A stabilizing arrangement according to claim 1, wherein skirts are provided along the undulations to contain the air passing over the undulations.

4. A stabilizing arrangement according to claim 1, wherein the undulations are provided at a mid-section of the vehicle.

5. A stabilizing arrangement according to claim 4, wherein the undulations further define a concave surface facing the underside of the vehicle.

6. A stabilizing arrangement according to claim 5, wherein skirts are provided along the undulations to contain the air passing over the undulations.

7. A stabilizing arrangement according to claim 1, wherein the undulations extend from the front end of the vehicle to the rear end of the vehicle.

8. A stabilizing arrangement according to claim 7, wherein the undulations further define a concave surface facing the underside of the vehicle.

9. A stabilizing arrangement according to claim 8, wherein skirts are provided along the undulations to contain the air passing over the undulations.

10. A stabilizing arrangement according to claim 1, wherein a cusp is defined where the undulations meet.

11. A stabilizing arrangement according to claim 1, wherein a smooth transition is defined where the undulations meet.

* * * * *